Oct. 10, 1933.　　　D. M. RUTHERFORD　　　1,930,184
CHICK FEEDER
Filed Aug. 25, 1931　　　2 Sheets-Sheet 1
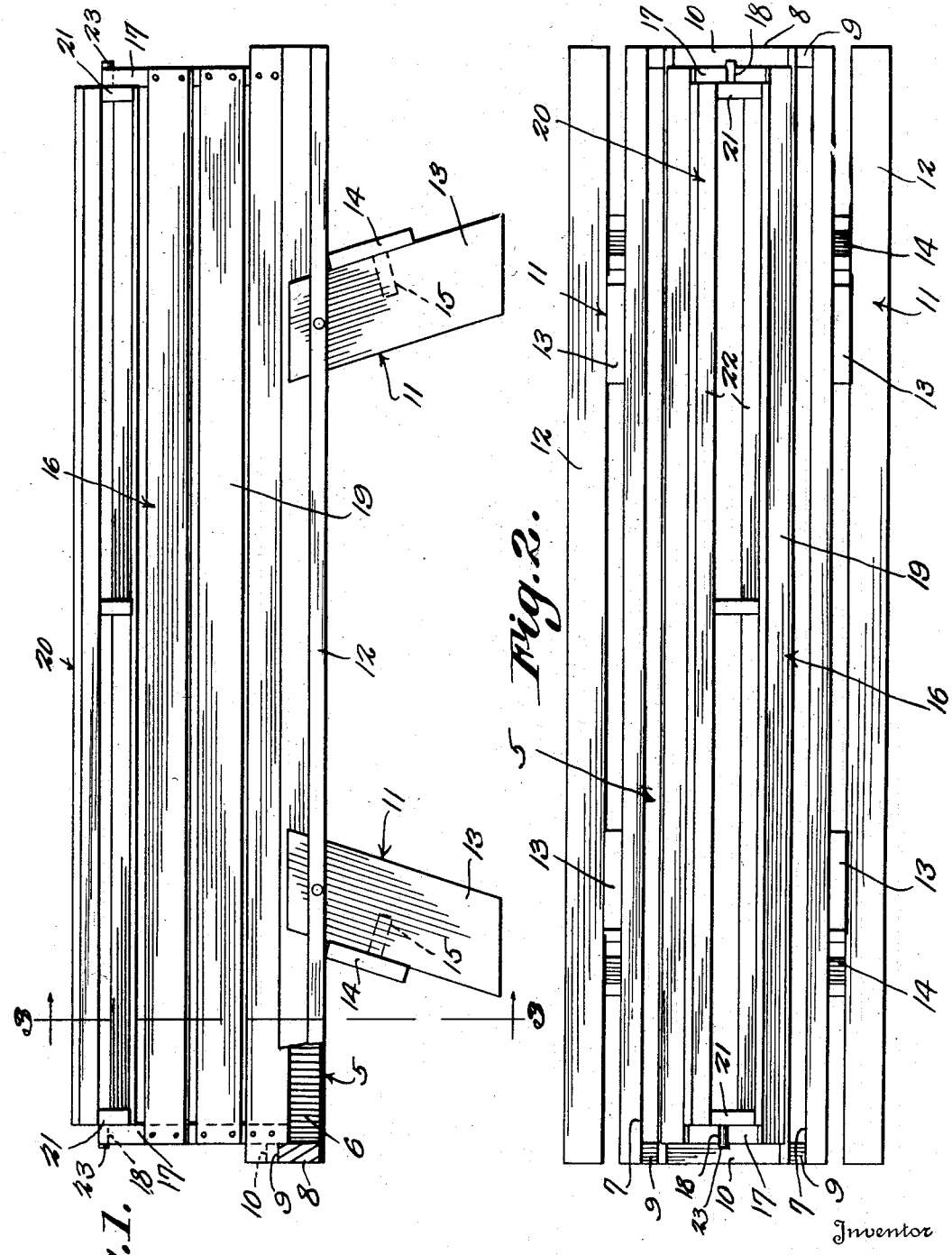
Inventor
Dwight M. Rutherford
By C. A. Snow & Co.
Attorneys.

Oct. 10, 1933.    D. M. RUTHERFORD    1,930,184
CHICK FEEDER
Filed Aug. 25, 1931    2 Sheets-Sheet 2
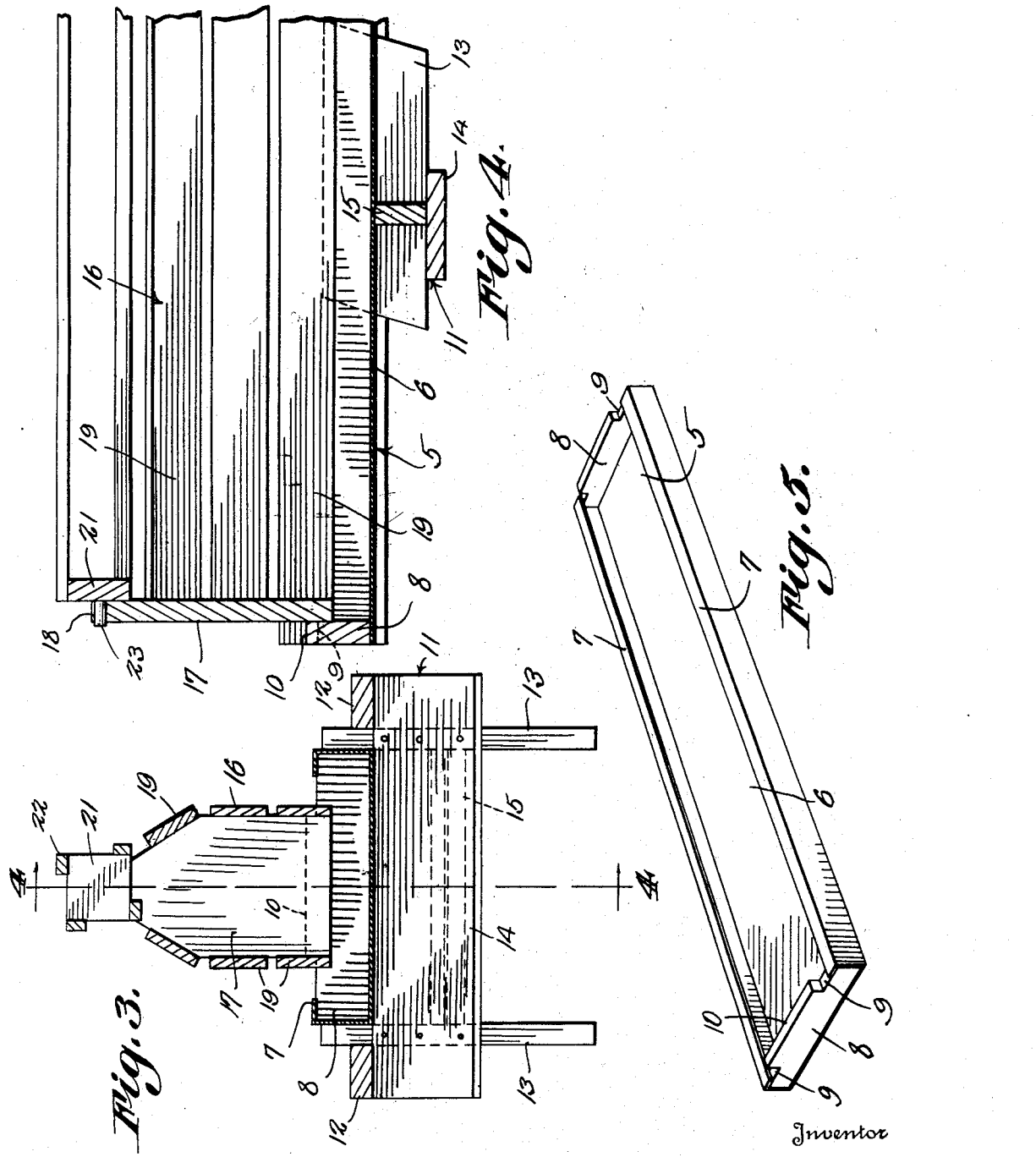
Inventor
Dwight M. Rutherford
By C. A. Snow & Co.
Attorneys.

Patented Oct. 10, 1933

1,930,184

UNITED STATES PATENT OFFICE 1,930,184

CHICK FEEDER

Dwight M. Rutherford, Two Rock, Calif.

Application August 25, 1931. Serial No. 559,309

1 Claim. (Cl. 119—52)

This invention relates to feeders designed primarily for use in feeding chicks.

An important object of the invention is to provide a feeder of this character which may be used for feeding chicks of various sizes, novel means being provided for adjusting the feeder vertically so that the pan or trough section thereof may be held at various positions with respect to the supporting surface.

Another object of the invention is the provision of a feeder which may be readily and easily disassembled to permit cleaning thereof with facility.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a chick feeder constructed in accordance with the invention.

Figure 2 is a plan view thereof.

Figure 3 is a sectional view taken on line 3—3 of Figure 1.

Figure 4 is an enlarged fragmental sectional view through the feeder, the legs thereof being in their folded positions.

Figure 5 is a perspective view of the pan or trough.

Referring to the drawings in detail, the feeder comprises a pan or trough indicated generally by the reference character 5, and comprises a body portion constructed of sheet metal material, the upper edges thereof being turned inwardly to prevent the feed contained in the pan, from being thrown from the pan while chickens are feeding therefrom.

End bars 8 form a part of the pan, and as shown are formed with cut out portions disposed at the ends thereof, which cut out portions provide upwardly extended portions 10, for purposes to be hereinafter more fully described.

The pan or trough 5, is held in spaced relation with the surface on which the feeder is positioned, by means of the support indicated generally by the reference character 11, which support comprises a rectangular frame embodying side bars 12, to which the leg members 13 are pivotally connected, the leg members being arranged in pairs near the ends of the support.

Connecting the leg members of each pair, is a bar 14, which bar also acts as a stop to engage the side bars, when the legs are extended as shown by Figure 1 of the drawings, thereby holding the leg members in their proper supporting positions.

Bars 15 are also connected with the leg members 13 at points directly at the rear of the bars 14, thereby providing a rigid brace for the side bars as well as the leg members.

It might be further stated that the width of the support is such that the pan or trough will be held tightly between the leg members 13, as clearly shown by Figure 3 of the drawings, to the end that the pan or trough will be securely held against movement with respect to the support.

Removably mounted on the pan or trough is a hopper 16 which comprises end members 17 that have their upper edges inclined towards the centers thereof, where they are formed with notches 18. These end members 17 are connected by means of the boards 19, that are secured to the side edges of the end members, the boards 19 being arranged in spaced relation with each other to allow a circulation of air into the hopper to ventilate the feed held therein.

The lower boards 19 of the hopper, are of lengths to extend beyond the end members 17, where they fit in the cut out portions 9 of the pan or trough in such a way that lateral movement of the hopper with respect to the pan or trough, is absolutely prevented, and the hopper is held against accidental displacement.

The end members 17 fit against the end bars 8 of the pan or trough and prevent longitudinal movement of the hopper with respect to the pan or trough.

The reference character 20 designates a rotary member that embodies rectangular end pieces 21, which are connected by means of the bars 22, which bars 22 are disposed laterally of the pins 23 that extend from the end pieces 21 at points centrally thereof.

Thus it will be seen that should a chick attempt to perch on one of the bars 22, the weight of the chick will cause the rotary member 20 to rotate with the result that the chick will immediately fall from its position on the rotary member, thereby preventing roosting of chicks on the top of the feeder.

In the use of the device, it is contemplated to use only the pan or trough, when the chicks are first hatched, and in their early stages of growth, but as the chicks grow, the pan or trough is then positioned on the support, elevating the pan or trough so that the chicks will have better access to the feed contained therein.

As the chicks become older, and the demand for feed is greater, the hopper is positioned over the pan or trough in a manner as described, to the end that an adequate supply of feed is insured at all times.

I claim:

In a feeder, a pan having end bars, the end bars having their upper edges cut away near the ends thereof defining upwardly extended portions, a hopper including lower side boards of lengths greater than the length of the hopper so that the ends of the lower side boards extend beyond the ends of the hopper providing supports, said extended ends of the lower side boards resting against the ends of the upwardly extended portions of the pan, the hopper being of a length to fit between the ends of the pan, and supporting legs on the feeder.

DWIGHT M. RUTHERFORD.